US007328623B2

(12) United States Patent
Slagle et al.

(10) Patent No.: US 7,328,623 B2
(45) Date of Patent: Feb. 12, 2008

(54) TEMPERATURE AND/OR PRESSURE SENSOR ASSEMBLY

(75) Inventors: Jason Corey Slagle, Liberty Township, OH (US); William Carl Ruehr, Cincinnati, OH (US); Jared Stephan Ashley, Kettering, OH (US); James Warren Hackler, Mason, OH (US); Jansen James Litter, Glendale, OH (US); Meiyun Li, Mason, OH (US); John Clisby Blanton, West Chester, OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 11/384,639

(22) Filed: Mar. 20, 2006

(65) Prior Publication Data

US 2007/0220984 A1    Sep. 27, 2007

(51) Int. Cl.
*G01L 19/04* (2006.01)

(52) U.S. Cl. .................................. 73/708; 60/226.1

(58) Field of Classification Search ............... 60/226.1, 60/39.093; 73/708
See application file for complete search history.

(56) References Cited

U.S. PATENT DOCUMENTS

| 2,625,010 | A | * | 1/1953 | Clark ...................... 60/39.093 |
| 2,858,698 | A | | 11/1958 | Hickey |
| 2,870,632 | A | | 1/1959 | Gaubatz |
| 2,870,633 | A | | 1/1959 | Harding et al. |
| 3,058,305 | A | | 10/1962 | Leigh |
| 3,834,157 | A | * | 9/1974 | Hoffmann ................ 60/39.093 |
| 4,099,691 | A | * | 7/1978 | Swanson et al. ............ 244/207 |
| 4,275,603 | A | | 6/1981 | Kalocsay |
| 5,043,558 | A | | 8/1991 | Byles |
| 5,114,100 | A | * | 5/1992 | Rudolph et al. ........ 244/134 C |
| 5,423,174 | A | * | 6/1995 | Mouton ................... 60/39.093 |
| 5,653,538 | A | | 8/1997 | Phillips |
| 6,561,760 | B2 | | 5/2003 | Wadia et al. |
| 6,651,515 | B2 | | 11/2003 | Bernard |
| 6,725,645 | B1 | * | 4/2004 | Wadia et al. .............. 60/226.1 |
| 2002/0131474 | A1 | | 9/2002 | Suga |

FOREIGN PATENT DOCUMENTS

GB    2 223 316    7/1988

* cited by examiner

*Primary Examiner*—Andre J. Allen
(74) *Attorney, Agent, or Firm*—Wesly A. Alig; William Scott Andes

(57) ABSTRACT

A sensor assembly includes a housing and a tube. The housing has a first leading edge portion which is capable of being located in a compressor/fan inlet flow path and which includes an interior wall section. The tube has a proximal portion including an air inlet which is adapted to receive a compressor bleed air flow and a distal portion which is located in the housing and which includes at least one air outlet hole. The hole is spaced apart from the interior wall section and is aligned to direct at least some compressor bleed air flow to impinge against the interior wall section. The housing includes an opening which receives air from the flow path when the housing is located in the flow path, wherein the opening is adapted for fluid communication with a sensor, and wherein the sensor measures at least one of air temperature and air pressure.

20 Claims, 5 Drawing Sheets

TEMPERATURE AND/OR PRESSURE SENSOR ASSEMBLY

BACKGROUND OF THE INVENTION

The present invention relates generally to temperature and/or pressure sensor assemblies, and more particularly to a temperature and/or pressure sensor assembly having a portion capable of being located in a compressor/fan inlet flow path.

Air temperature and/or pressure sensor assemblies are known which have a monolithic or a contiguous two part (an upstream part or shield and a downstream part) housing mounted to a fan hub frame of an aircraft gas turbine engine, which include leading and trailing edges located in a high-pressure-compressor/fan inlet flow path, and which include a sensor (such as a resistance temperature detector and/or a pressure transducer) which is located in or apart from the housing. The housing includes an opening which receives air from the compressor/fan inlet flow path, wherein the opening is in fluid communication with the sensor. In one example, the sensor is located in the housing and is in fluid communication with aspirated air from the compressor/fan inlet flow path. The leading and trailing edges of the housing are electrically heated during idle decent conditions to eliminate ice buildup on the housing. Air temperature sensor assemblies are also known which measure the fan inlet temperature, which open a bleed line valve when ice is detected on the housing to have compressor bleed air wash over the exterior of the housing to melt the detected ice, such bleed air then mixing with the fan inlet air, and such mixed air then encountering the temperature detector. It is noted that in a contiguous two part housing, the upstream part or shield minimizes ice accretion on the downstream part of the housing which includes the opening and may also include the sensor. Some known shields segment ice accretion into separate pieces, wherein each piece has a small mass which does not adversely affect downstream components of the engine.

Still, scientists and engineers continue to seek improved temperature and/or pressure sensor assemblies.

BRIEF DESCRIPTION OF THE INVENTION

A first expression of an embodiment of the invention is a sensor assembly including a housing and a tube. The housing has a first leading edge portion which is capable of being located in a compressor/fan inlet flow path and which includes an interior wall section. The tube has a proximal portion and a distal portion. The proximal portion includes an air inlet which is adapted to receive a compressor bleed air flow. The distal portion is located in the housing and includes at least one air outlet hole. The at-least-one air outlet hole is spaced apart from the interior wall section and is aligned to direct at least some of the compressor bleed air flow to impinge against the interior wall section. The housing includes an opening which receives air from the compressor/fan inlet flow path when the housing is disposed in the compressor/fan inlet flow path, wherein the opening is adapted for fluid communication with a sensor, and wherein the sensor measures at least one of air temperature and air pressure.

In one example of the first expression of the embodiment of the invention, use of impinging compressor bleed air on an interior wall section of a leading edge portion is a more efficient heating method to prevent ice buildup than conventionally using heated air washed over the exterior of the housing or conventionally using an electrical heater to heat the leading and trailing edges of the housing.

BRIEF DESCRIPTION OF THE DRAWING

The accompanying drawing illustrates an embodiment of the invention wherein.

DETAILED DESCRIPTION OF THE INVENTION

Figure 1:
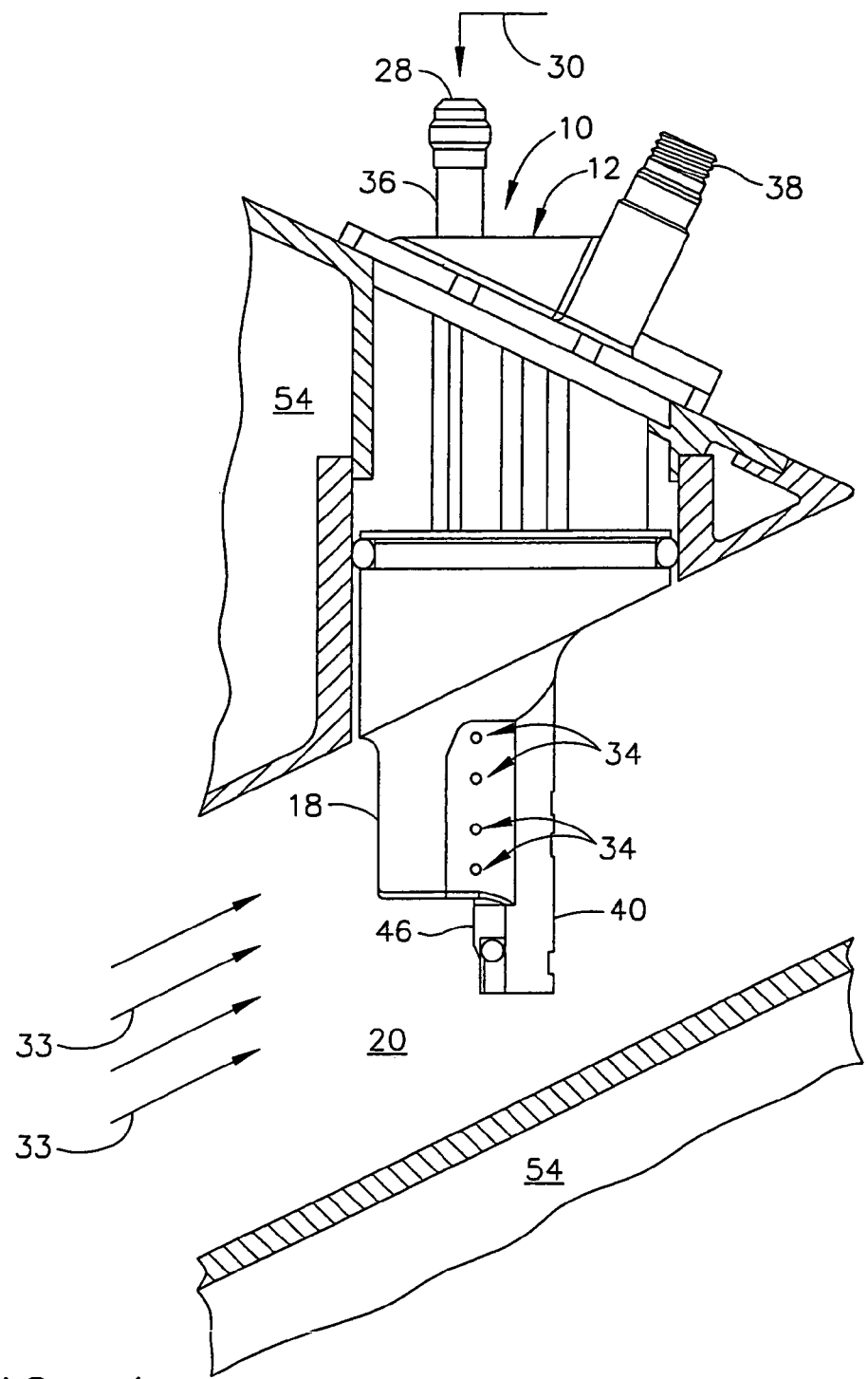
FIG. 1 is a schematic view of a portion of an embodiment of an aircraft gas turbine engine including an embodiment of a sensor assembly Of the invention.
Figure 2:
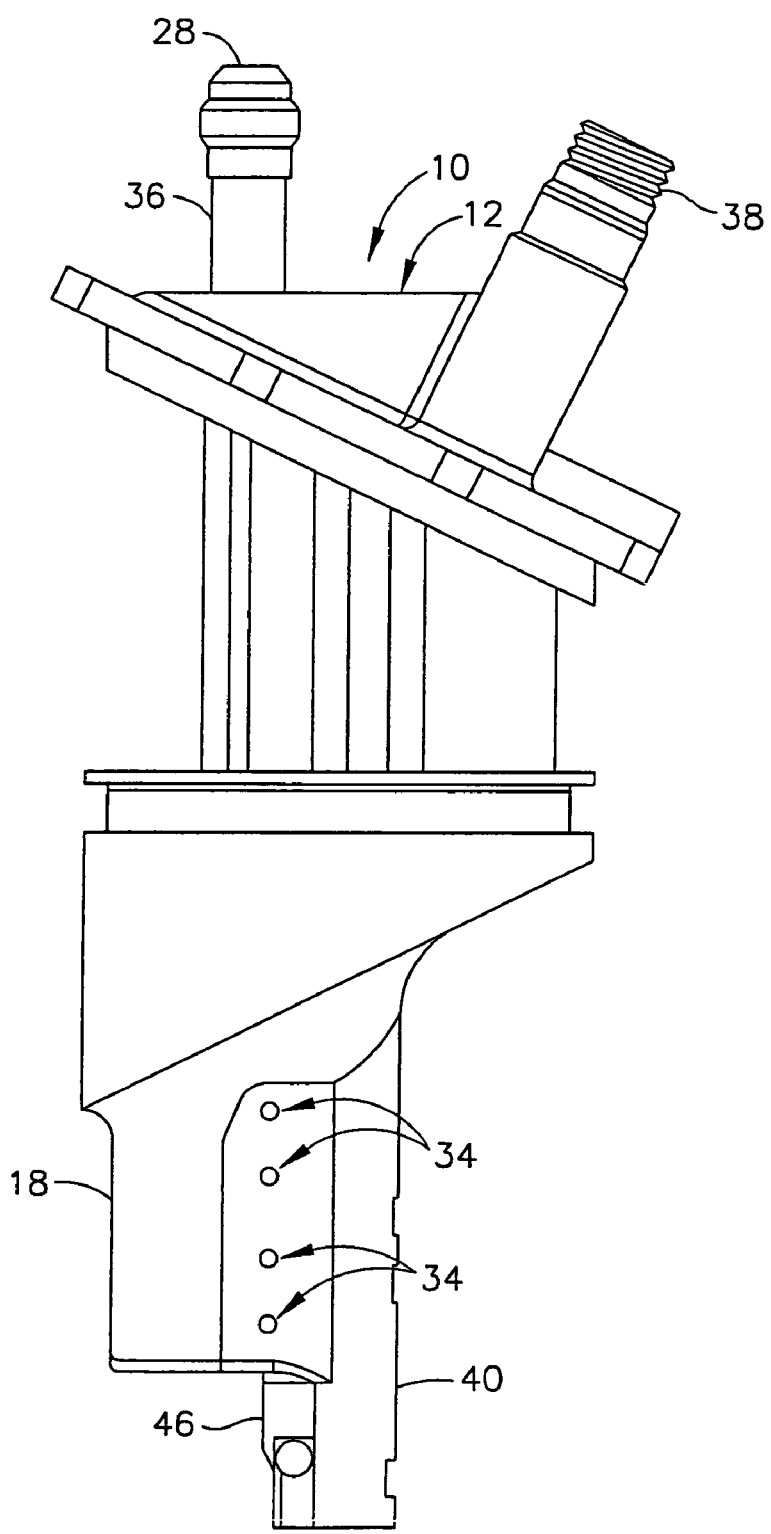
FIG. 2 is an enlarged side elevational view of the sensor assembly of FIG. 1.
Figure 3:
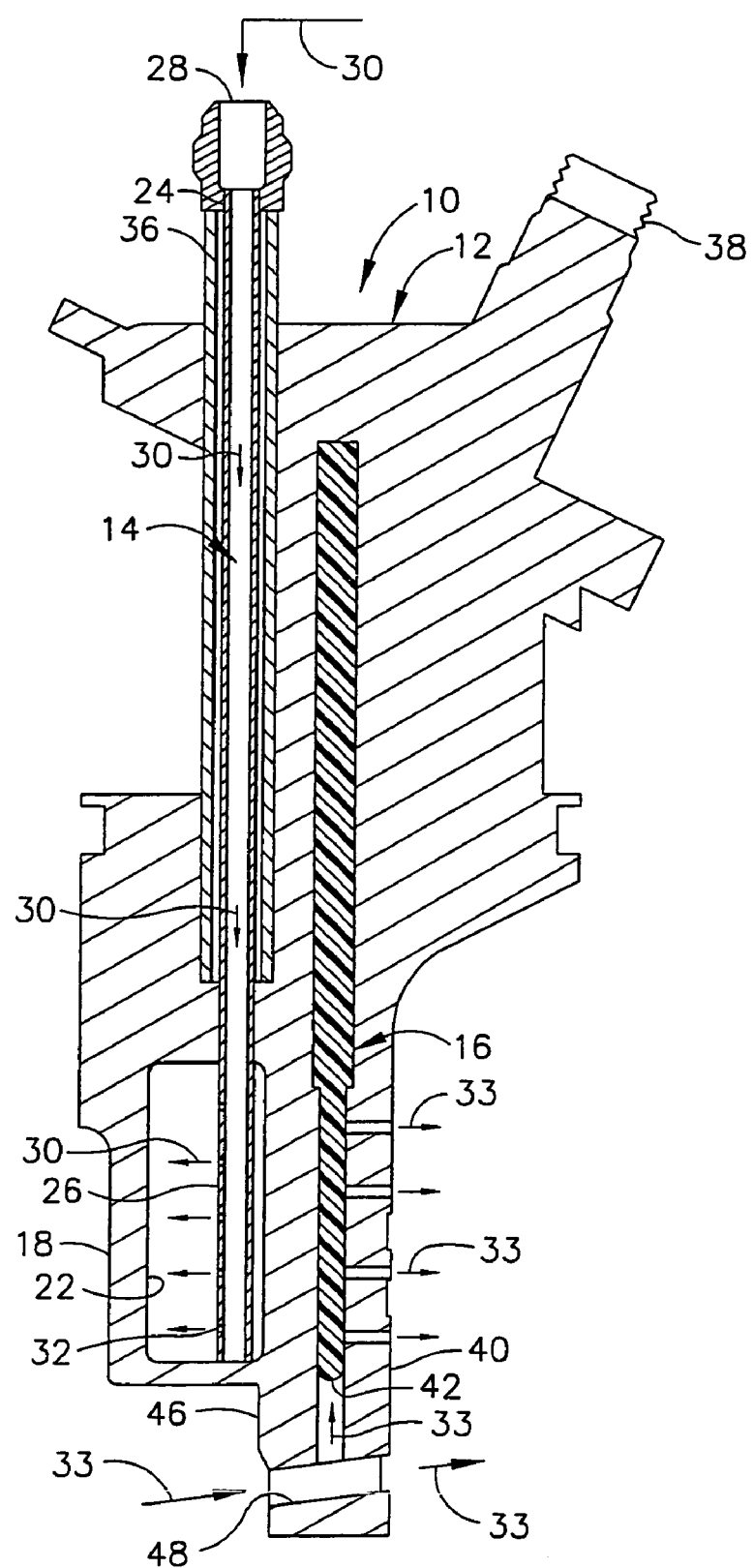
FIG. 3 is a cutaway view of the sensor assembly of FIG. 2.
Figure 4:
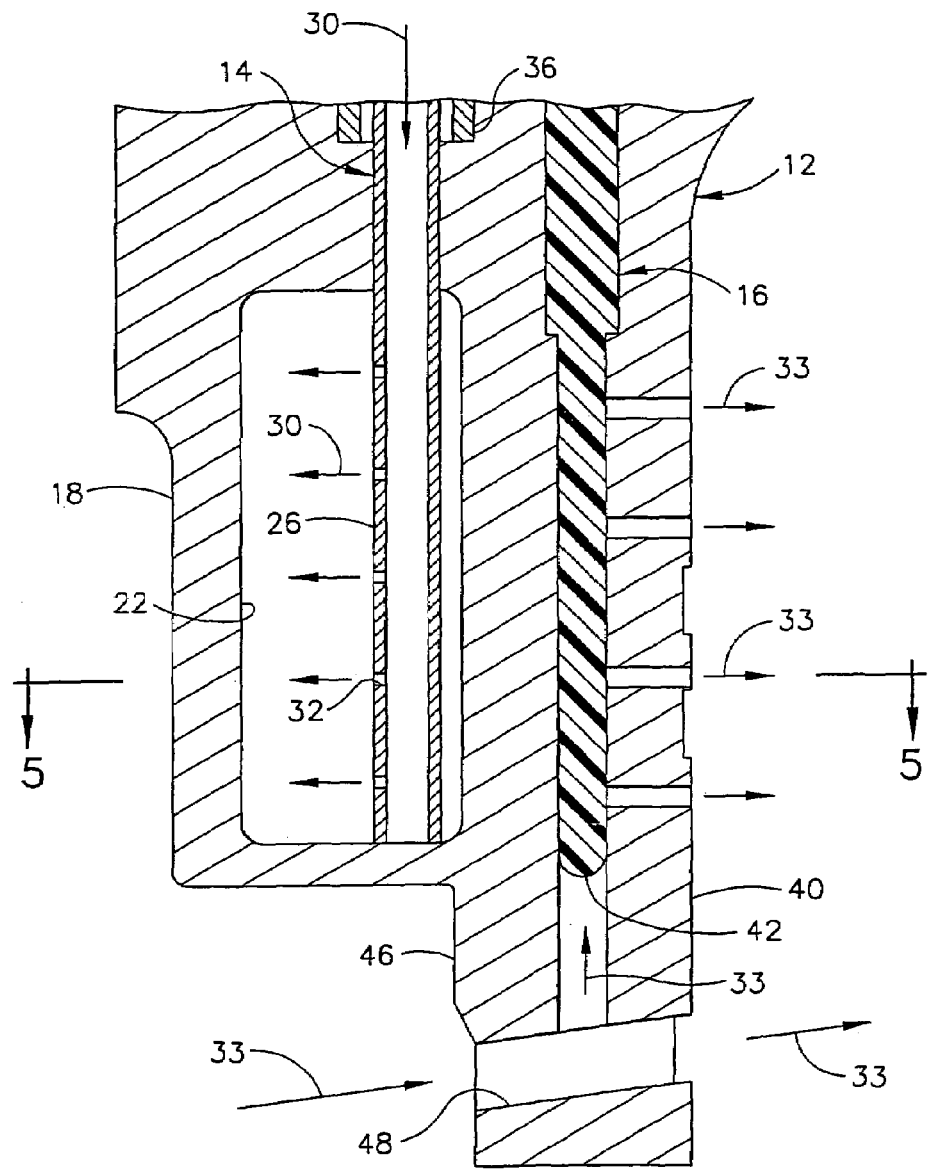
FIG. 4 is an enlarged view of a lower portion of the sensor assembly of FIG. 3.
Figure 5:
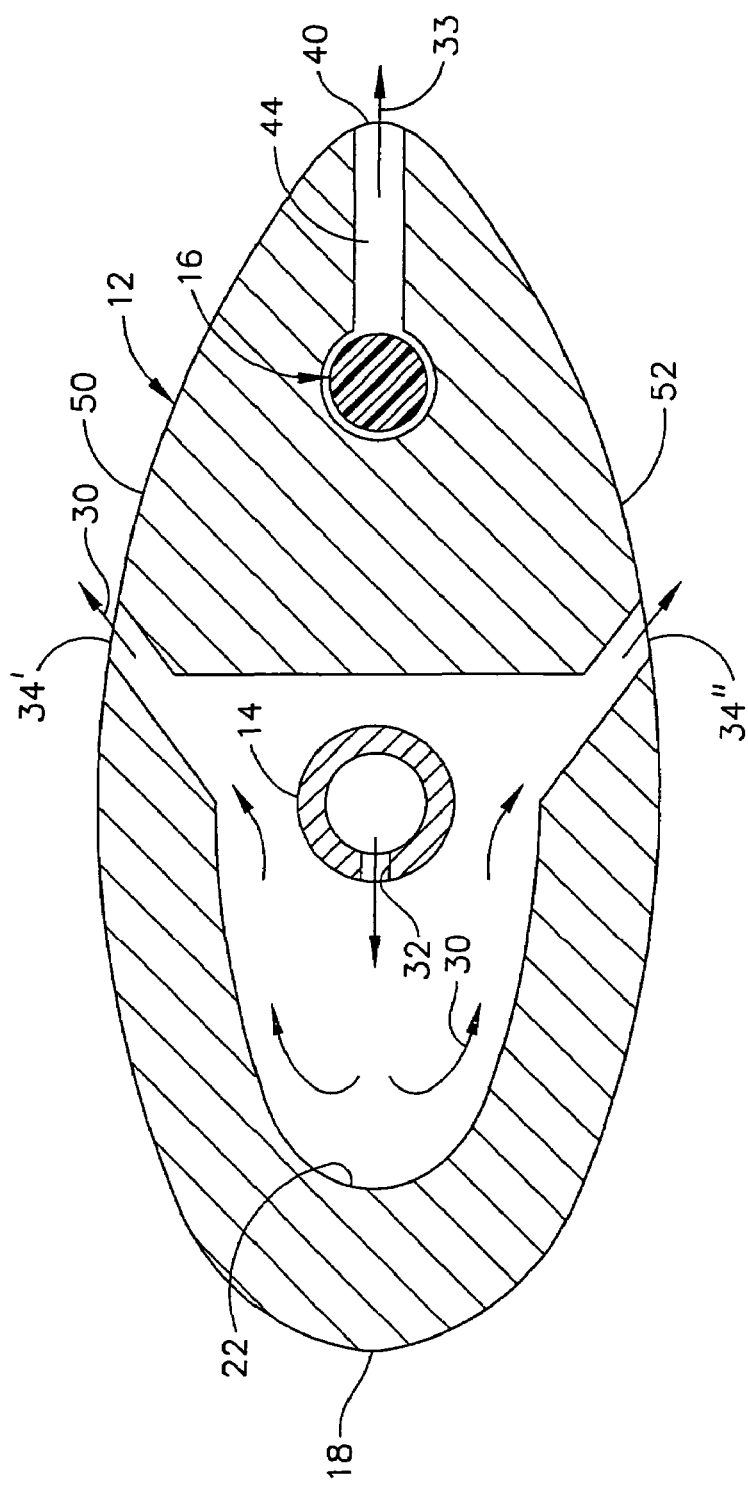
FIG. 5 is a cross-sectional view taken along lines 5-5 of FIG. 4.

Referring now to the drawing, FIGS. 1-5 disclose an embodiment of the invention. A first expression of the embodiment of FIGS. 1-5 is for a sensor assembly 10 including a housing 12 and a tube 14. The housing 12 has a first leading edge portion 18 which is disposable in a compressor/fan inlet flow path 20 and which includes an interior wall section 22. The tube 14 has a proximal portion 24 and a distal portion 26. The proximal portion 24 includes an air inlet 28 which is adapted to receive a compressor bleed air flow 30. The distal portion 26 is disposed in the housing 12 and includes at least one air outlet hole 32 which is spaced apart from the interior wall section 22 and which is aligned to direct at least some of the compressor bleed air flow 30 to impinge against the interior wall section 22. The housing 12 includes an opening (such as, but not limited to, an air scoop 48) which receives air 33 from the compressor/fan inlet flow path 20 when the housing 12 is disposed in the compressor/fan inlet flow path 20, wherein the opening (such as air scoop 48) is adapted for fluid communication with a sensor 16, and wherein the sensor 16 measures at least one of air temperature sensor and air pressure. In one example, the compressor/fan inlet flow path 20 is a compressor inlet flow path. In another example, the compressor/fan inlet flow path 20 is a fan inlet flow path.

A leading edge portion of the housing 12 is a portion of the housing 12 disposed at and/or proximate a leading edge of the housing 12. It is noted that the compressor bleed air flow 30 is an air flow which has been heated by compression, and that, in one example, such heated air flow impinging against the interior wall section 22 will efficiently prevent ice buildup on the housing 12, as can be appreciated by those skilled in the art. In one example, the housing 12 is a monolithic housing. In another example, not shown, the housing is a contiguous multi part housing. In one variation, the multi part housing includes an upstream part or shield associated with the tube 14 and a downstream part contacting the shield and associated with the opening (such as an air scoop 43). In one modification, not shown, only a portion of the tube 14 is spaced apart from surrounding structure (note that the aft portion of the tube 14 in FIG. 5 could be part of the housing 12 or, although not shown in FIG. 5, the aft portion of the tube 14 could be part of the shield in a contiguous two part housing, wherein a vertical line could be drawn in FIG. 5 just aft of the exhaust holes 34' and 34" to divide the housing 12 into an upstream part or shield and a downstream part. It is noted that, for some installations, space requirements call for a contiguous two part housing to separately install the upstream part or shield and the downstream part.

In a first example, the sensor 16 measures air temperature and is disposed in the housing 12. In another example, not shown, the sensor includes an air temperature sensor portion disposed in the housing and an air pressure sensor portion disposed apart from the housing wherein a common or separate housing openings are associated with the two sensor portions and are adapted for total or static air pressure measurement by the air pressure sensor portion. In one enablement of the first expression of the embodiment of FIGS. 1-5, the at-least-one air outlet hole 32 includes a plurality of air outlet holes 32. In one variation, the plurality of air outlet holes 32 are substantially linearly aligned. In the same or a different enablement, the housing 12 includes at least one spent-impingement-air exhaust hole 34 which is in fluid communication with at least some of the compressor bleed air flow 30 which impinged against the interior wall section 22. In the same or a different enablement, the sensor assembly 10 also includes a tubular sheath 36 surrounding, and spaced apart from, the proximal portion 24 of the tube 14. In one example, the air space between the tube 14 and the tubular sheath 36 provides thermal protection, against the heated air in the tube 14, for the sensor 16, and any other temperature-sensitive parts. In one choice of materials, the housing 12, the tube 14 and the tubular sheath 36 consist essentially of steel.

In one application of the first expression of the embodiment of FIGS. 1-5, the compressor bleed air flow 30 is an aircraft gas-turbine-engine compressor bleed air flow. In one variation, the aircraft gas-turbine-engine compressor bleed air flow is an aircraft gas-turbine-engine high-pressure-compressor bleed air flow. It is noted that at certain ambient atmospheric conditions experienced by the aircraft, ice crystals and air can enter the compressor/fan inlet flow path 20 and cause ice to form on leading edge portions of the housing of air temperature sensors. In one method of operating the sensor assembly 10, a valve, not shown, controls the compressor bleed air flow 30 received by the air inlet 28 of the tube 14. In one variation, the valve is kept open except during takeoff. In another method, the air inlet 28 of the tube 14 is in valve-less fluid communication with the compressor bleed air flow 30 so that the housing 12 is always heated when the aircraft gas turbine engine is operating. Other methods of operating the sensor assembly 10 are left to the artisan.

In one implementation of the first expression of the embodiment of FIGS. 1-5, the sensor 16 is in fluid communication with aspirated air from the compressor/fan inlet flow path 20. In this implementation, the sensor 16 measures a total air temperature (i.e., an air temperature of air that has been reduced to a relatively very low speed compared to the flowpath). In one example, the sensor assembly 10 includes an electrical connector 38 which is attached to the housing 12, which is operatively connected to the sensor 16, and which is adapted for connection to a controller (not shown) which adjusts several engine parameters.

In the same or a different implementation, the housing 12 includes a trailing edge 40 which is disposable in the compressor/fan inlet flow path 20, wherein the sensor 16 is disposed between the tube 14 and the trailing edge 40. In one variation, the distal portion 26 of the tube 14 is disposed proximate the first leading edge portion 18, and the sensor 16 is disposed proximate the leading edge 40. In one modification, the sensor 16 has its sensing tip 42 spaced apart from the surrounding housing 12 to provide thermal protection against heat from the tube 14, as can be appreciated by the artisan.

In one arrangement of the first expression of the embodiment of FIGS. 1-5, the housing 12 includes at least one air outlet passageway 44 leading from the sensor 16 to the trailing edge 40. In one variation, the housing 12 includes a second leading edge portion 46, wherein, when the first leading edge portion 18 is disposed in the compressor/fan inlet flow path 20, the second leading edge portion 46 extends a greater distance into the compressor/fan inlet flow path 20 than does the first leading edge portion 18 and the second leading edge portion 46 is disposed downstream of the first leading edge portion. 18. In one design, the second leading edge portion 46 includes an air scoop 48, wherein the sensor 16 is in aspirated fluid communication with air entering the air scoop 48.

In one configuration of the design having the air scoop 48, the housing 12 includes at least one spent-impingement-air exhaust hole 34 which is in fluid communication with at least some of the compressor bleed air flow 30 which impinged against the interior wall section 22 of the first leading edge portion 18 of the housing 12. In one example, when the first leading edge portion 18 is disposed in the compressor/fan inlet flow path 20, the air scoop 48 is disposed a greater distance into the compressor/fan inlet flow path 20 than is the at-least-one spent-impingement-air exhaust hole 34. This avoids any of the spent heated air from entering the air scoop 48 to adversely affect air temperature measurements, as can be appreciated by those skilled in the art. In one variation, the housing 12 includes first and second sides 50 and 52 extending from the first leading edge portion 18 to the trailing edge 40, the at-least-one spent-impingement-air exhaust hole 34 includes a first air exhaust hole 34' disposed on the first side 50 and a second air exhaust hole 34" disposed on the second side 52. In this variation, the first and second air exhaust holes 34' and 34" are disposed upstream from the sensor 16 allowing the exhausted spent heated air to mix with, and be cooled by, air in the compressor/fan inlet flow path 20 before passing the area of the housing 12 containing the sensor 16.

In one deployment of the first expression of the embodiment of FIGS. 1-5, the housing 12 is attachable to an aircraft-gas-turbine-engine structure (such as, for example, an aircraft-gas-turbine-engine fan hub frame 54).

A second expression of the embodiment of FIGS. 1-5 is for a sensor assembly 10 including a housing 12 and a tube 14. The housing 12 has a first leading edge portion 18 which is disposed in a compressor/fan inlet flow path 20 and which includes an interior wall section 22. The tube 14 has a proximal portion 24 and a distal portion 26. The proximal portion 24 includes an air inlet 28 which is adapted to receive a compressor bleed air flow 30. The distal portion 26 is disposed in the housing 12 and includes at least one air outlet hole 32 which is spaced apart from the interior wall section 22 and which is aligned to direct at least some of the compressor bleed air flow 30 to impinge against the interior wall section 22. The housing 12 includes an opening (such as, but not limited to, an air scoop 48) which receives air 33 from the compressor/fan inlet flow path 20, wherein the opening (such as air scoop 48) is adapted for fluid communication with a sensor 16, and wherein the sensor 16 measures at least one of air temperature and air pressure. In one example, the compressor/fan inlet flow path 20 is a compressor inlet flow path. In another example, the compressor/fan inlet flow path 20 is a fan inlet flow path.

In one deployment of the second expression of the embodiment of FIGS. 1-5, the housing 12 is attached to an aircraft-gas-turbine-engine structure (such as, for example, an aircraft gas turbine engine fan hub frame 54).

While the present invention has been illustrated by a description of several expressions of an embodiment, it is not the intention of the applicants to restrict or limit the spirit and scope of the appended claims to such detail. Numerous other variations, changes, and substitutions will occur to those skilled in the art without departing from the scope of the invention.

The invention claimed is:

1. A sensor assembly comprising:
   a) a housing having a first leading edge portion which is disposable in a compressor/fan inlet flow path and which includes an interior wall section;
   b) a tube having a proximal portion including an air inlet which is adapted to receive a compressor bleed air flow and having a distal portion disposed in the housing and including at least one air outlet hole which is spaced apart from the interior wall section and which is aligned to direct at least some of the compressor bleed air flow to impinge against the interior wall section,
   wherein the housing includes an opening which receives air from the compressor/fan inlet flow path when the housing is disposed in the compressor/fan inlet flow path, wherein the opening is adapted for fluid communication with a sensor, and wherein the sensor measures at least one of air temperature and air pressure.

2. The sensor assembly of claim 1, wherein the sensor measures air temperature and is disposed in the housing.

3. The sensor assembly of claim 2, wherein the at-least-one air outlet hole includes a plurality of air outlet holes.

4. The sensor assembly of claim 3, wherein the plurality of air outlet holes are substantially linearly aligned.

5. The sensor assembly of claim 2, wherein the housing includes at least one spent-impingement-air exhaust hole which is in fluid communication with at least some of the compressor bleed air flow which impinged against the interior wall section.

6. The sensor assembly of claim 2, also including a tubular sheath surrounding, and spaced apart from, the proximal portion of the tube.

7. The sensor assembly of claim 6, wherein the housing, the tube, and the tubular sheath consist essentially of steel.

8. The sensor assembly of claim 2, wherein the compressor bleed air flow is an aircraft gas-turbine-engine compressor bleed air flow.

9. The sensor assembly of claim 8, wherein the aircraft gas-turbine-engine compressor bleed air flow is an aircraft gas-turbine-engine high-pressure-compressor bleed air flow.

10. The sensor assembly of claim 2, wherein the sensor is in fluid communication with aspirated air from the compressor/fan inlet flow path.

11. The sensor assembly of claim 2, wherein the housing includes a trailing edge which is disposable in the compressor/fan inlet flow path, and wherein the sensor is disposed between the tube and the trailing edge.

12. The sensor assembly of claim 11, wherein the housing includes at least one air outlet passageway leading from the sensor to the trailing edge.

13. The sensor assembly of claim 12, wherein the housing includes a second leading edge portion, wherein, when the first leading edge portion is disposed in the compressor/fan inlet flow path, the second leading edge portion extends a greater distance into the compressor/fan inlet flow path than does the first leading edge portion and the second leading edge portion is disposed downstream of the first leading edge portion, wherein the second leading edge portion includes an air scoop, and wherein the sensor is in aspirated fluid communication with air entering the air scoop.

14. The sensor assembly of claim 13, wherein the housing includes at least one spent-impingement-air exhaust hole which is in fluid communication with at least some of the compressor bleed air flow which impinged against the interior wall section of the first leading edge portion of the housing, and wherein, when the first leading edge portion is disposed in the compressor/fan inlet flow path, the air scoop is disposed a greater distance into the compressor/fan inlet flow path than is the at-least-one spent-impingement-air exhaust hole.

15. The sensor assembly of claim 14, wherein the housing includes first and second sides extending from the first leading edge portion to the trailing edge, wherein the at-least-one spent-impingement air exhaust hole includes a first air exhaust hole disposed on the first side and a second air exhaust hole disposed on the second side, and wherein the first and second air exhaust holes are disposed upstream from the sensor.

16. The sensor assembly of claim 2, wherein the housing is attachable to an aircraft-gas-turbine-engine structure.

17. A sensor assembly comprising:
   a) a housing having a first leading edge portion which is disposed in a compressor/fan inlet flow path and which includes an interior wall section;
   b) a tube having a proximal portion including an air inlet receiving a compressor bleed air flow and having a distal portion disposed in the housing and including at least one air outlet hole which is spaced apart from the interior wall section and which is aligned to direct at least some of the compressor bleed air flow to impinge against the interior wall section,
   wherein the housing includes an opening which receives air from the compressor/fan inlet flow path, wherein the opening is adapted for fluid communication with a sensor, and wherein the sensor measures at least one of air temperature and air pressure.

18. The sensor assembly of claim 17, wherein the housing is attached to an aircraft-gas-turbine-engine structure, and wherein the housing is one of a monolithic housing and a contiguous multi part housing.

19. A sensor assembly comprising:
   a) a housing having a first leading edge portion which is disposable in a compressor/fan inlet flow path and which includes an interior wall section;
   b) a tube having a proximal portion including an air inlet which is adapted to receive a compressor bleed air flow and having a distal portion disposed in the housing and including at least one air outlet hole which is spaced apart from the interior wall section and which is aligned to direct at least some of the compressor bleed air flow to impinge against the interior wall section; and
   c) a sensor which measures air temperature, which is disposed within the housing and which is in fluid communication with air from the compressor/fan inlet flow path when the first leading edge portion is disposed in the compressor flow path,
   wherein the housing includes at least one spent-impingement-air exhaust hole which is in fluid communication with at least some of the compressor bleed air flow which impinged against the interior wall section, also including a tubular sheath surrounding, and spaced apart from, the proximal portion of the tube, wherein the sensor is in fluid communication with aspirated air from the compressor/fan inlet flow path, wherein the housing includes a trailing edge which is disposable in the compressor/fan inlet flow path, and wherein the sensor is disposed between the tube and the trailing edge, and wherein the housing includes at least one air outlet passageway leading from the sensor to the trailing edge.

20. The sensor assembly of claim 19, wherein the housing includes a second leading edge portion, wherein, when the first leading edge portion is disposed in the compressor/fan inlet flow path, the second leading edge portion extends a greater distance into the compressor/fan inlet flow path than does the first leading edge portion, wherein the second leading edge portion is disposed downstream of the first leading edge portion, wherein the second leading edge portion includes an air scoop, and wherein the sensor is in aspirated fluid communication with air entering the air scoop, wherein the housing includes at least one spent-impingement-air exhaust hole which is in fluid communication with at least some of the compressor bleed air flow which impinged against the interior wall section of the leading edge portion of the housing, and wherein, when the first leading edge portion is disposed in the compressor/fan inlet flow path, the air scoop is disposed a greater distance into the compressor/fan inlet flow path than is the at-least-one spent-impingement-air exhaust hole, wherein the housing includes first and second sides extending from the first leading edge portion to the trailing edge, wherein the at-least-one spent-impingement air exhaust hole includes a first air exhaust hole disposed on the first side and a second air exhaust hole disposed on the second side, and wherein the first and second air exhaust holes are disposed upstream from the sensor, and wherein the housing is attachable to an aircraft gas turbine engine structure.

* * * * *